US012585129B2

(12) United States Patent
Hu et al.

(10) Patent No.: US 12,585,129 B2
(45) Date of Patent: Mar. 24, 2026

(54) WEIGHT-BALANCING ASSEMBLY AND VR HEAD BAND WITH WEIGHT-BALANCING ASSEMBLY

(71) Applicant: Shenzhen Xiaozhai Technology Co., Ltd., Shenzhen (CN)

(72) Inventors: Xiaomin Hu, Shenzhen (CN); Zhiwu Zou, Shenzhen (CN)

(73) Assignee: Shenzhen Xiaozhai Technology Co., Ltd., Shenzhen (CN)

( * ) Notice: Subject to any disclaimer, the term of this patent is extended or adjusted under 35 U.S.C. 154(b) by 23 days.

(21) Appl. No.: 19/054,788

(22) Filed: Feb. 15, 2025

(65) Prior Publication Data

US 2025/0189805 A1 Jun. 12, 2025

(30) Foreign Application Priority Data

Jan. 21, 2025 (CN) .......................... 202520140762.5

(51) Int. Cl.
*G02B 27/01* (2006.01)

(52) U.S. Cl.
CPC .. *G02B 27/0176* (2013.01); *G02B 2027/0152* (2013.01); *G02B 2027/0156* (2013.01)

(58) Field of Classification Search
CPC .................... G02B 27/0152; G02B 2027/0152
See application file for complete search history.

(56) References Cited

U.S. PATENT DOCUMENTS

| | | | | |
|---|---|---|---|---|
| 5,739,893 | A * | 4/1998 | Karasawa .......... | G02B 27/0176 351/158 |
| 2007/0018908 | A1* | 1/2007 | Nakabayashi ..... | G02B 27/0176 345/8 |
| 2010/0026609 | A1* | 2/2010 | Otsuki .................. | H01M 10/48 429/97 |
| 2010/0092847 | A1* | 4/2010 | Li ....................... | H01M 50/209 429/97 |
| 2018/0055202 | A1* | 3/2018 | Miller ................ | G02B 27/0176 |
| 2020/0159037 | A1 | 5/2020 | Li et al. | |
| 2021/0080996 | A1* | 3/2021 | Hudman ............ | G02B 27/0176 |
| 2021/0325681 | A1* | 10/2021 | Yoshida ............. | G02B 27/0176 |
| 2021/0341748 | A1* | 11/2021 | Patel ..................... | G02C 7/088 |

(Continued)

*Primary Examiner* — Bipin Gyawali
(74) *Attorney, Agent, or Firm* — Zhigang Ma

(57) ABSTRACT
A weight-balancing assembly and a virtual reality (VR) head band with the weight-balancing assembly are provided. The weight-balancing assembly is arranged on a back pillow bracket of a back pillow assembly to solve the above-mentioned technical problem. The weight-balancing assembly includes a weight-balancing box, a weight-balancing block, and a weight-balancing compartment cover; the weight-balancing box is provided with a fitting surface for fitting a radian of the back side of the head of a human body; the weight-balancing box is connected to the back pillow bracket in various mounting modes; a weight-balancing compartment is arranged in the weight-balancing box; the weight-balancing block is arranged in the weight-balancing compartment; and a quantity of the weight-balancing block can be adjusted according to an actual situation. An elastic buffer member that satisfies a tolerance is provided for mounting of the weight-balancing block, to adapt to mounting of weight-balancing blocks with various sizes.

1 Claim, 13 Drawing Sheets

(56)        References Cited

U.S. PATENT DOCUMENTS

| | | | |
|---|---|---|---|
| 2023/0152594 A1 * | 5/2023 | Davidson | G06F 1/203 |
| | | | 359/601 |
| 2023/0397349 A1 * | 12/2023 | Capelli | G02B 27/0176 |
| 2024/0028074 A1 | 1/2024 | Gu | |
| 2024/0103572 A1 * | 3/2024 | Martinez | G06F 1/163 |
| 2024/0111163 A1 * | 4/2024 | Law | A61M 21/00 |
| 2024/0201939 A1 | 6/2024 | Zhang | |
| 2024/0337867 A1 * | 10/2024 | Xu | G02B 27/017 |
| 2025/0190017 A1 * | 6/2025 | Law | G06F 3/011 |

* cited by examiner

Cross-sectional
view of A-A

WEIGHT-BALANCING ASSEMBLY AND VR HEAD BAND WITH WEIGHT-BALANCING ASSEMBLY

TECHNICAL FIELD

The present disclosure relates to the technical field of assistive devices for wearing virtual reality (VR) equipment, and in particular, to a weight-balancing assembly and a VR head band with the weight-balancing assembly.

BACKGROUND

A VR head band is used as an assistive tool for assisting VR equipment to be worn on a head. The comfort level of wearing the VR head band is crucial. At present, the most widely used VR head band generally includes side straps and a back pillow assembly. During use, the VR head band is clamped and connected to the VR equipment through clamping claws of the side straps on two sides, and sleeves the back side of a head through the back pillow assembly for use. However, the back pillow assembly of the current VR head band lacks an effective weight-balancing mechanism. After heavier VR equipment is mounted on the VR head band, a user may feel heavy in the front and light in the back, which causes the VR equipment at the front end to pull the back pillow assembly at the rear end to upward tilt. As a result, the user needs to constantly adjust the wearing posture. To solve such a problem, for some VR head bands in the future, an enclosing ring between the side straps and the back pillow assembly is adjusted to adjust tightness of wearing. However, the entire head band is tightened by making the back pillow assembly tilt upwards, which makes the user feel uncomfortable in the head. How to keep front and back weights of the VR head band consistent without adjusting the tightness is a technical problem to be solved.

SUMMARY

To overcome the shortcomings in the prior art, the present disclosure aims to provide a weight-balancing assembly and a VR head band with the weight-balancing assembly.

To solve the above technical problems, the present disclosure is achieved using the following technical solutions:

A weight-balancing assembly includes a weight-balancing box, a weight-balancing block, and a weight-balancing compartment cover; one side of the weight-balancing box is sunken to form a weight-balancing compartment; the weight-balancing block is embedded in the weight-balancing compartment, to achieve weight balancing on a target device; the weight-balancing compartment cover is arranged on an outer side of the weight-balancing compartment and is opened and closed through a first locking member; the weight-balancing box has a fitting surface; and the fitting surface has a curved surface adapting to the back side of the head of a human body.

In a further improvement, the weight-balancing box includes a bottom shell and a cover shell; a bottom side of the bottom shell is sunken to form the weight-balancing compartment; the bottom shell and the cover shell are detachably connected to each other through a second locking member; and after the bottom shell is connected to the cover shell, the target device with a hollow groove can be clamped to achieve mounting and connection to the target device.

In a further improvement, the fitting surface of the weight-balancing box is provided with a fitting component; and mounting and connection between the weight-balancing assembly and the target device are achieved through he fitting component.

In a further improvement, the bottom shell includes a panel, a bottom enclosing ring, and a compartment seat; the bottom enclosing ring is arranged at an upper end of the panel; the compartment seat is arranged on an inner side of the bottom enclosing ring; an inner side of the compartment seat is sunken to form the weight-balancing compartment; a bottom clamping portion is formed in a region, protruding out of the bottom enclosing ring, of the upper end of the panel; the cover shell comprises a surface cover and a top enclosing ring; the top enclosing ring is arranged on an inner side of the surface cover; and a top clamping portion is formed in a region of the surface cover protruding out of the top enclosing ring.

In a further improvement, the first locking member is a clip-type locking member, and comprises a pull clip and a locking slot; the pull clip is arranged on one side of the weight-balancing compartment cover; the clip is V-shaped; a free end of the pull clip is formed into a pull portion, and a first buckle is arranged on an outer side of the pull portion; the locking slot is provided in one side of the weight-balancing compartment; a first buckle slot is provided on one side of the locking slot; a hinge hole is provided in the other side of the weight-balancing compartment; and a hinge shaft is arranged at a position, corresponding to the hinge hole, on the weight-balancing compartment cover.

In a further improvement, the second locking member is a clip-type locking member, and includes a second buckle and a second buckle slot; the second buckle is arranged on a side wall of the bottom enclosing ring; the second buckle slot is provided in a position, corresponding to the second buckle, on a side wall of the top enclosing ring; and when the bottom shell and the cover shell are mounted, the top enclosing ring is embedded into the inner side of the bottom enclosing ring, and mounting and locking of the bottom shell and the cover shell are completed through buckling between the second buckle and the second buckle slot.

In a further improvement, an elastic buffer member is arranged on an inner side of the weight-balancing compartment; the elastic buffer member comprises a buffer clip and an elastic convex point; the buffer clip is arranged at an inner compartment bottom of the weight-balancing compartment; and the elastic convex point is inwards arranged on an end surface of a free end of the buffer clip.

In a further improvement, the weight-balancing compartment is composed of a plurality of branch compartments; and the plurality of branch compartments are distributed along a radian of the fitting surface of the weight-balancing box.

In a further improvement, a placement slot is provided in one side of the compartment seat; and the hinge hole is an open hinge hole and is located on one side of the placement slot.

The present disclosure further provides a VR head band with a weight-balancing assembly, including a back pillow assembly and side straps. Side portions of the back pillow assembly are connected with the side straps, and the foregoing weight-balancing assembly is mounted on the back pillow assembly.

In a further improvement, the back pillow assembly includes a back pillow bracket and back pillow cotton; an upper end of the back pillow bracket is hollowed out to form a hollow groove; the bottom enclosing ring of the bottom shell is threaded out of the hollow groove and is mounted and connected to the cover shell; the bottom clamping portion of the bottom shell and the top clamping portion of the cover shell clamp the back pillow bracket; and the back pillow cotton is arranged on an inner side of the back pillow bracket.

Compared with the prior art, the present disclosure has the beneficial effects below:

According to the present disclosure, the weight-balancing assembly is arranged on the back pillow bracket of the back pillow assembly to solve the above-mentioned technical problem. The weight-balancing assembly includes the weight-balancing box, the weight-balancing block, and the weight-balancing compartment cover; the weight-balancing box is further provided with the fitting surface for fitting the radian of the back side of the head of a human body; the weight-balancing box is connected to the back pillow bracket in various mounting modes; the weight-balancing compartment is arranged in the weight-balancing box; the weight-balancing block is arranged in the weight-balancing compartment; and a quantity of the weight-balancing block can be adjusted according to an actual situation. The elastic buffer member that satisfies a tolerance is provided for mounting of the weight-balancing block, to adapt to mounting of weight-balancing blocks with various sizes and different weights. When the weight-balancing assembly is used, the problem that a user wearing a VR head band feels heavy in front and light in back can be solved, and the comfort level of wearing cannot be affected.

Figure 1:
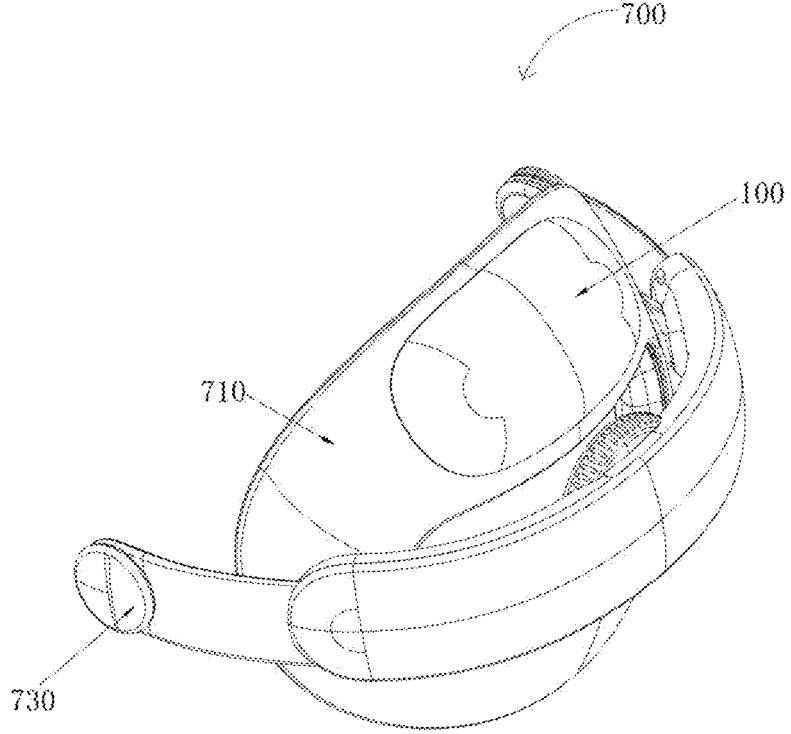
FIG. 1 is a schematic structural diagram I of a VR head band with a weight-balancing assembly in the present disclosure.
Figure 2:
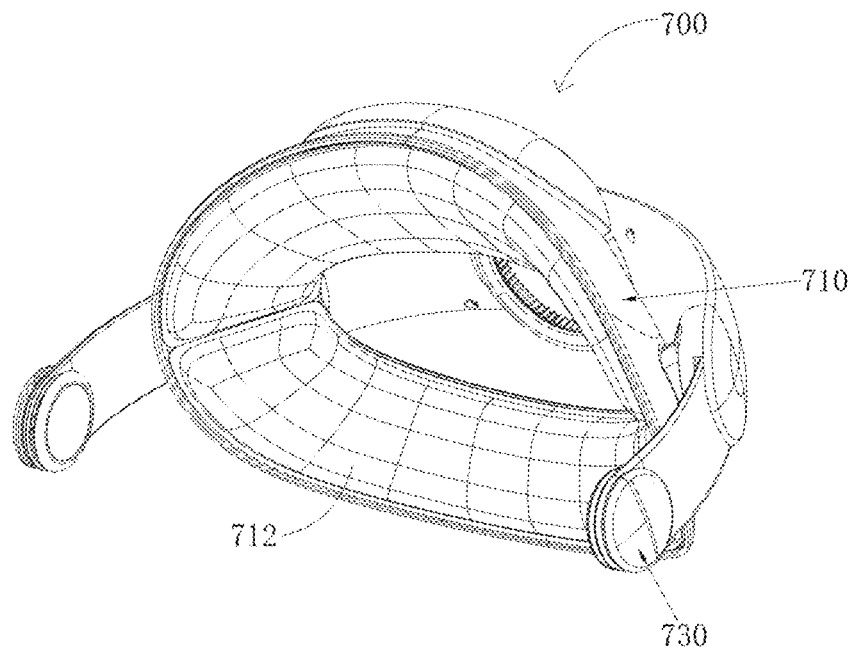
FIG. 2 is a schematic structural diagram II of a VR head band with a weight-balancing assembly in the present disclosure.
Figure 3:
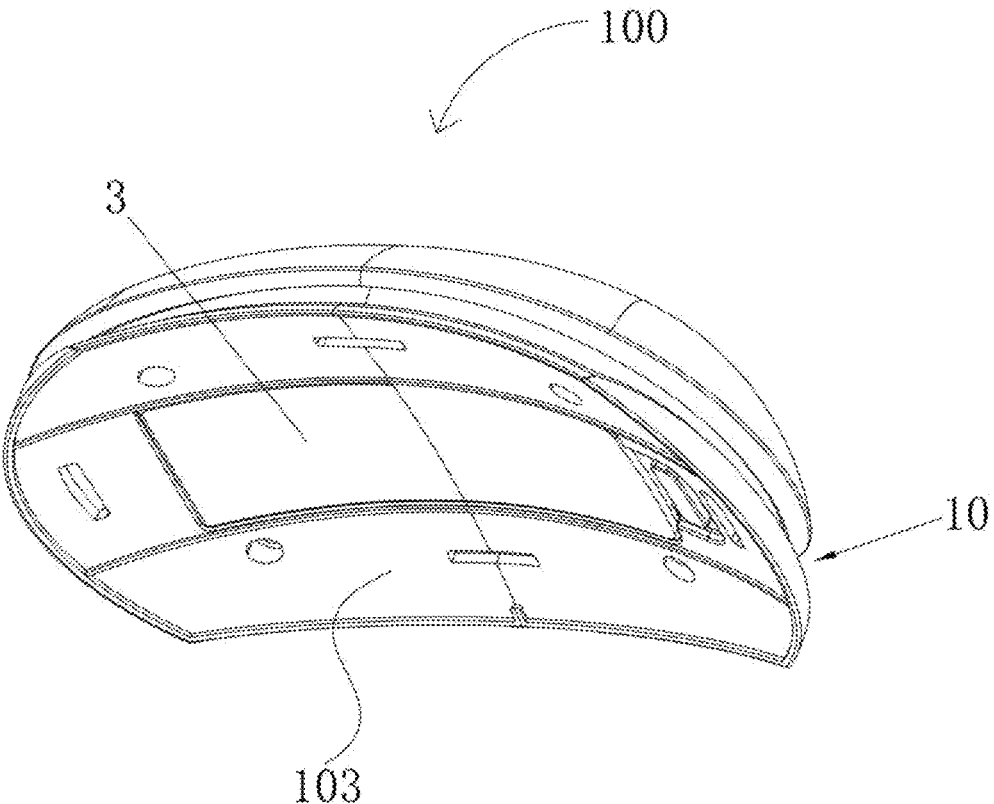
FIG. 3 is a schematic diagram I of an assembling state of a weight-balancing assembly in the present disclosure.
Figure 4:
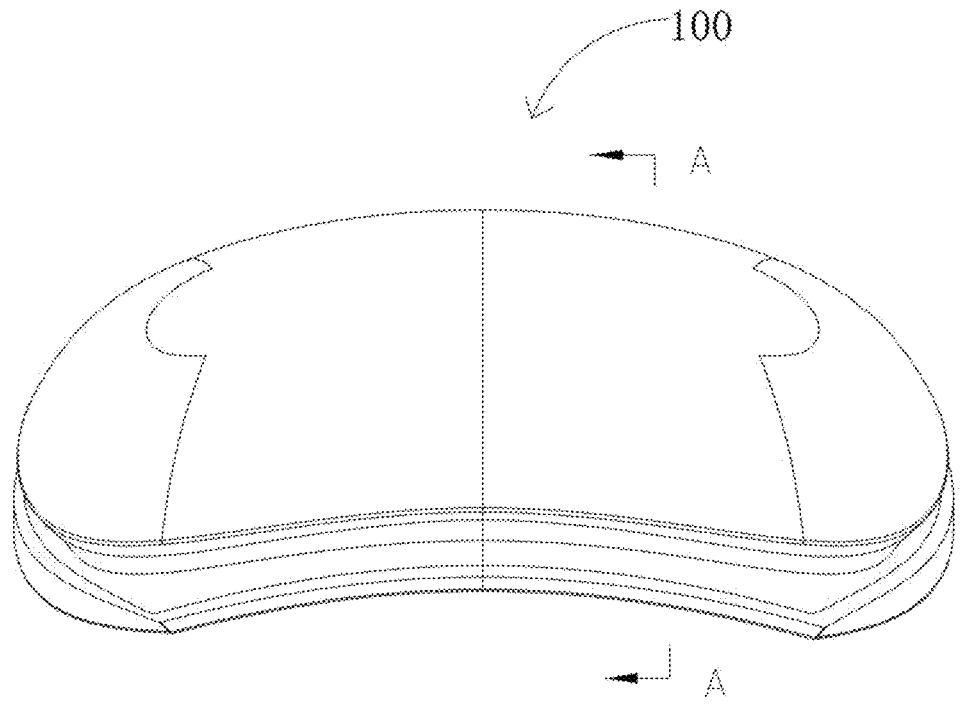
FIG. 4 is a schematic diagram II of an assembling state of a weight-balancing assembly in the present disclosure.
Figure 5:
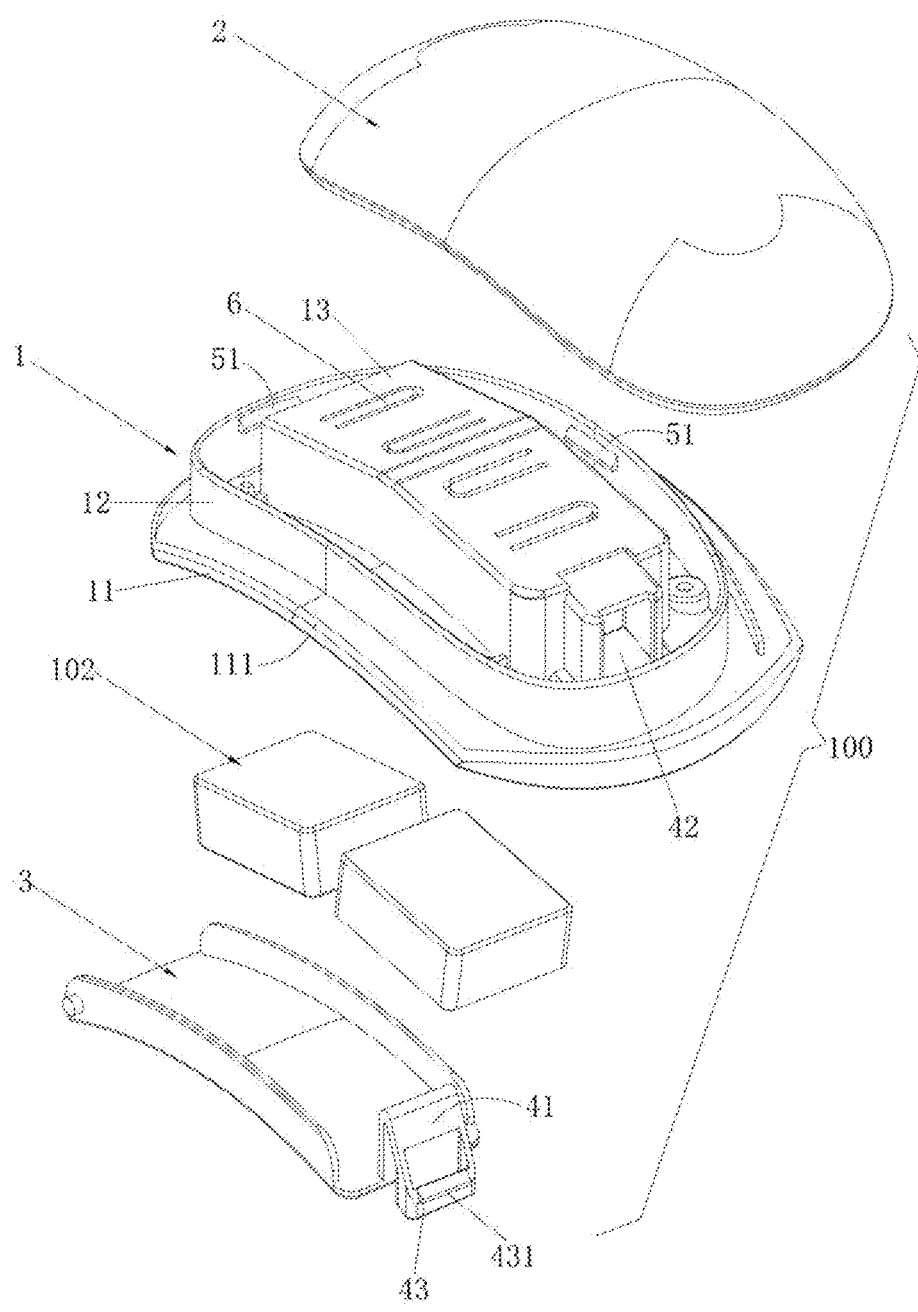
FIG. 5 is a schematic diagram I of an exploded state of a weight-balancing assembly in the present disclosure.
Figure 6:
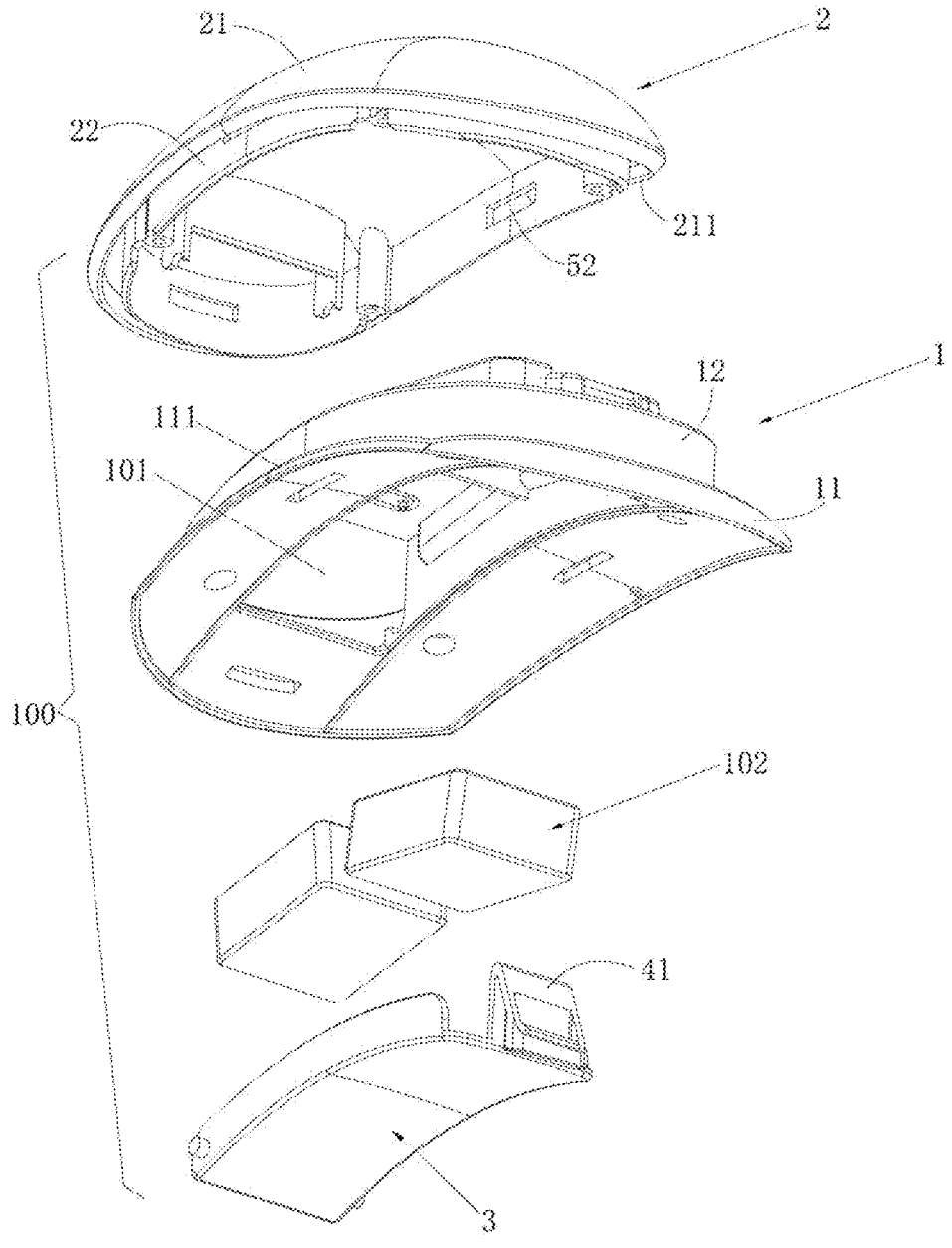
FIG. 6 is a schematic diagram II of an exploded state of a weight-balancing assembly in the present disclosure.
Figure 7:
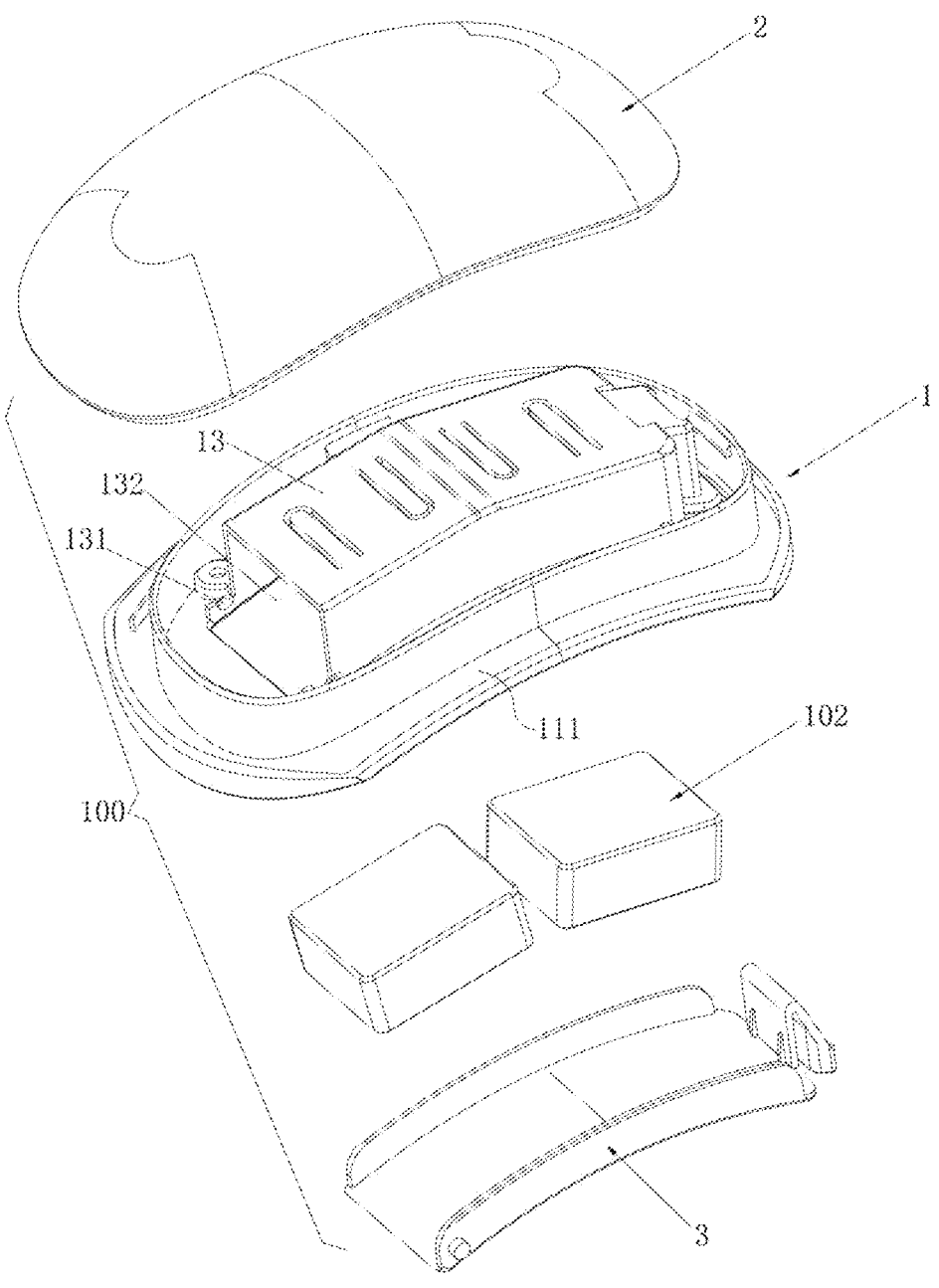
FIG. 7 is a schematic diagram III of an exploded state of a weight-balancing assembly in the present disclosure.

In the drawings: 100: weight-balancing assembly; 10: weight-balancing box; 101: weight-balancing compartment; 102: weight-balancing block; 3: weight-balancing compartment cover; 103: fitting surface; 1: bottom shell; 2: cover shell; 11: panel; 12: bottom enclosing ring; 13: compartment seat; 111: bottom clamping portion; 21: surface cover; 22: top enclosing ring; 211: top clamping portion; 41: pull clip; 43: pull portion; 42: locking slot; 431: first buckle; 421: first clamping slot; 131: hinge hole; 31: hinge shaft; 51: second buckle; 52: second buckle slot; 6: elastic buffer member; 61: buffer clip; 62: elastic convex point; 101*a*: branch compartment; 132: placement slot; 700: VR head band; 710: back pillow assembly; 730: side strap; 711: back pillow bracket; 712: back pillow cotton; and 711*a*: hollow groove.

DETAILED DESCRIPTION OF THE EMBODIMENTS

The present disclosure is further described below in combination with accompanying drawings and specific implementations. It should be noted that all embodiments or all technical features described below can be combined arbitrarily to form new embodiments. Referring to FIG. 1 to FIG. 13:

The present disclosure discloses a weight-balancing assembly 100, including a weight-balancing box 10, a weight-balancing block 102, and a weight-balancing compartment cover 33. One side of the weight-balancing box 10 is sunken to form a weight-balancing compartment 101. The weight-balancing compartment 101 is configured to mount a weight-balancing block 102. Preferably, a plurality of branch compartments 101*a* are provided in the weight-balancing compartment 101. At least one weight-balancing block 102 is arranged in each branch compartment 101*a*. Weights of the weight-balancing blocks 102 can be adjusted according to different sets of VR equipment, to achieve a state that weights in the front and back parts of the head of a human body after the human body wears VR equipment are balanced. Specifically, to timely replace different weight-balancing blocks 102, the weight-balancing compartment 101 here is set to be provided with an opening. The opening is controlled to be opened and closed through a weight-balancing compartment cover 33, and the weight-balancing compartment cover 33 is opened and closed through a first locking member. In a preferred embodiment, for the first locking member, refer to an opening mode for an existing battery box. Of course, the weight-balancing compartment cover 33 can also be opened and closed through magnetic suction, buckles, and hook and loop fasteners. To achieve perfect fit mounting between the weight-balancing assembly 100 and a back pillow assembly 710 of a VR head band 700, the weight-balancing box 10 has a fitting surface 103. The fitting surface 103 has a curved surface equivalent to the back side of the head of the human body. In an embodiment of mounting the weight-balancing assembly 100 and the target VR headband 700, the fitting surface 103 has two different functions. In one embodiment, the weight-balancing assembly 100 is directly fitted to a back side of the back pillow assembly 710, by using, such as a hook and loop fastener or magnetic suction. In this case, the fitting surface 103 is used as a fitting component for mounting the target back pillow assembly 710. In the other embodiment, a hollow groove 711*a* is provided in the back pillow assembly 710, and the weight assembly 100 is clamped on the back pillow assembly 710 by a bottom shell 1 and a cover shell 2 in a split form in a clamping way such as buckles, hook and loop fasteners, and magnetic suction. In this case, a bottom of the fitting surface 103 is matched with a soft cushion to achieve the function of fitting the back side of the head.

Specifically, the weight-balancing box 10 includes a bottom shell 1 and a cover shell 2; a bottom side of the bottom shell 1 is sunken to form the weight-balancing compartment 101; the bottom shell 1 and the cover 2 shell are detachably connected to each other through a second locking member; and after the bottom shell 1 is connected to the cover shell 2, the target device with a hollow groove 711a can be clamped to achieve mounting and connection to the target device. The target device here is the back pillow assembly 710 of the VR head band 700. Specifically, the bottom shell 1 includes a panel 11, a bottom enclosing ring 12, and a compartment seat 13; the bottom enclosing ring 12 is arranged at an upper end of the panel 11; the compartment seat 13 is arranged on an inner side of the bottom enclosing ring 12; an inner side of the compartment seat 13 is sunken to form the weight-balancing compartment 101; a bottom clamping portion 111 is formed in a region, protruding out of the bottom enclosing ring 12, of the upper end of the panel 11; the cover shell 2 includes a surface cover 21 and a top enclosing ring 22; the top enclosing ring 22 is arranged on an inner side of the surface cover 21; and a top clamping portion 211 is formed in a region of the surface cover 21 protruding out of the top enclosing ring 22. Preferably, a diameter of the top enclosing ring 22 is less than that of the bottom enclosing ring 12, which causes the top enclosing ring 22 to extend into the inner side of the bottom enclosing ring 12. Then, the bottom clamping portion 111 and the top clamping portion 211 are used together to clamp an edge of the hollow groove 711a in the back pillow assembly 710, thus forming a mechanism for mounting and fixing the target device through clamping.

Specifically, the first locking member is a clip-type locking member, and includes a pull clip 41 and a locking slot 42; the pull clip 41 is arranged on one side of the weight-balancing compartment cover 33; the clip is V-shaped; one end of the clip is connected to the weight-balancing compartment cover 33, and the other end extends outwards; a free end of the pull clip 41 is formed into a pull portion 43, and a first buckle 431 is arranged on an outer side of the pull portion 43; the locking slot 42 is provided in one side of the weight-balancing compartment 101; a first buckle slot 421 is provided on one side of the locking slot 42; a hinge hole 131 is provided in the other side of the weight-balancing compartment 101; and a hinge shaft 31 is arranged at a position, corresponding to the hinge hole 131, on the weight-balancing compartment cover 33. During mounting, one end of the weight-balancing compartment cover 33 is hinged to the weight-balancing compartment 101 through the hinge shaft 31 and hinge hole 131, and the other end is locked by cooperation between the first buckle 431 and the first buckle slot 421. During buckling, a main body of the V-shaped clip is embedded into the locking slot 42. The first buckle slot 421 is provided in the inner side of the locking slot 42. In this case, the first buckle 431 can just be clamped onto the first buckle slot 421. Since the clip is V-shaped, when unlocking is needed, only the pull portion 43 is manually pulled and pressed inwards. In this case, the first buckle 431 can be separated from the first buckle 431 to complete unlocking.

Specifically, the second locking member is a clip-type locking member, and includes a second buckle 51 and a second buckle slot 52; the second buckle 51 is arranged on a side wall of the bottom enclosing ring 12; the second buckle slot 52 is provided in a position, corresponding to the second buckle 51, on a side wall of the top enclosing ring 22; and when the bottom shell 1 and the cover shell 2 are mounted, the top enclosing ring 22 is embedded into the inner side of the bottom enclosing ring 12, and mounting and locking of the bottom shell 1 and the cover shell 2 are completed through buckling between the second buckle 51 and the second buckle slot 52. In a subsequent improved embodiment, a threaded hole is further provided between the bottom shell 1 and the cover shell 2. The bottom shell 1 and the cover shell 2 can be further locked and fixed through screw fixing.

Specifically, since different VR host units have different weights, and different VR head bands have different configurations, When the above differences are combined together, weights in the front and back parts of the head may change. Therefore, a user can select different weight-balancing blocks 102 according to a VR host unit used by the user and a VR head band selected by the user. When the weight-balancing blocks 102 with different sizes and weights are mounted in the weight-balancing compartment 101, due to the difference in size, the weight-balancing compartment 101 with the same compartment volume cannot adapt to the various weight-balancing blocks 102. A solution is provided here. An elastic buffer member 6 is arranged on an inner side of the weight-balancing compartment 101; the elastic buffer member 6 includes a buffer clip 61 and an elastic convex point 62; the buffer clip 61 is arranged at an inner compartment bottom of the weight-balancing compartment 101; and the elastic convex point 62 is inwards arranged on an end surface of a free end of the buffer clip 61. Preferably, the buffer clip 61 is formed in a bottom wall of the compartment seat 13 in a U-shaped hollow manner. Of course, it can also be made in a form of a direct spring. The buffer clip 61 has elasticity because only one part of the buffer clip is attached to the bottom wall of the compartment seat 13 at one point. The elastic convex point 62 is arranged in a manner of facing the opening of the weight-balancing compartment 101 or towards the weight-balancing block 102. When the weight-balancing block 102 is placed inwards into the weight-balancing compartment 101, the convex point may be inwards pressed, and the buffer clip 61 is driven inwards by the convex point. Finally, with the locking and pressing of the weight-balancing compartment cover 33 outside, stable mounting of the weight-balancing block 102 is completed, and different types of weight-balancing blocks 102 with different sizes can be used to meet a need of adjusting the weights and sizes of the weight-balancing blocks 102.

Figure 8:
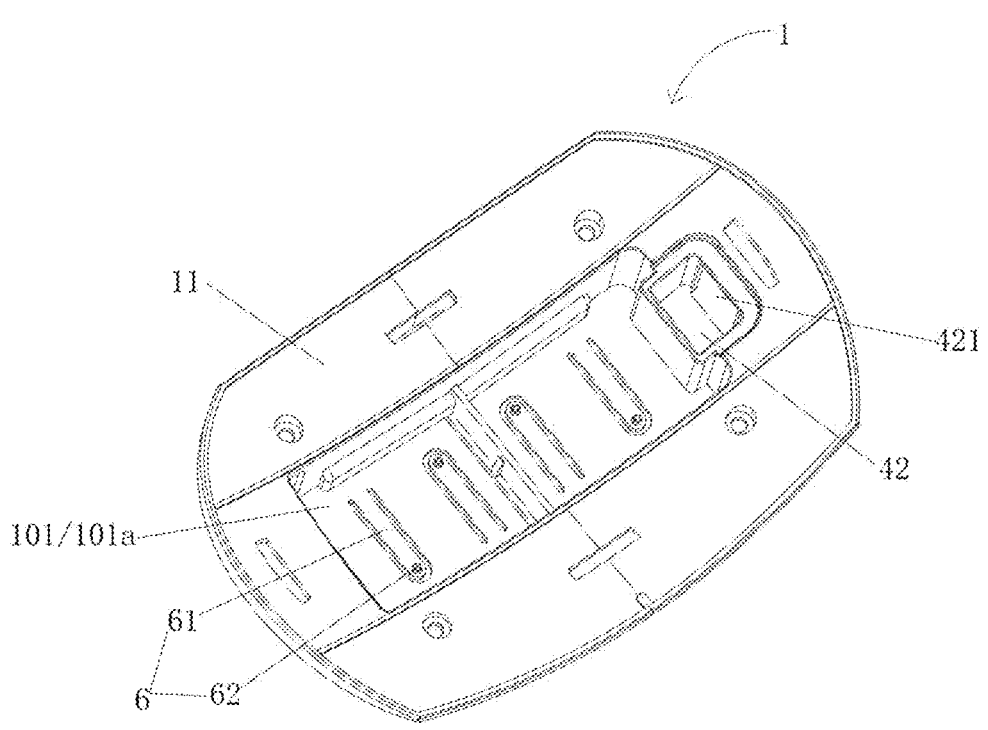
FIG. 8 is a schematic structural diagram of a bottom shell in a weight-balancing assembly according to the present disclosure.
Figure 9:
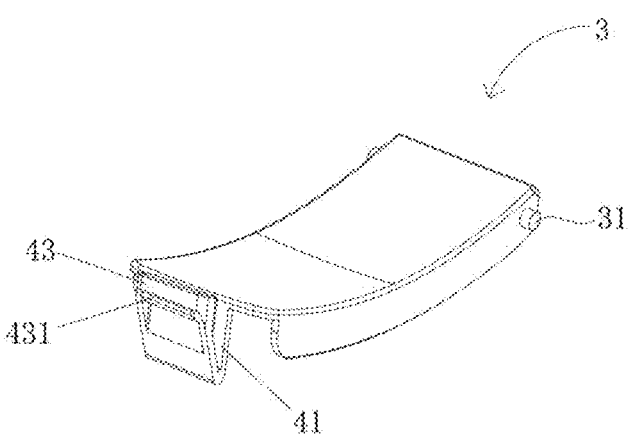
FIG. 9 is a schematic structural diagram of a weight-balancing compartment cover in a weight-balancing assembly according to the present disclosure.
Figure 10:
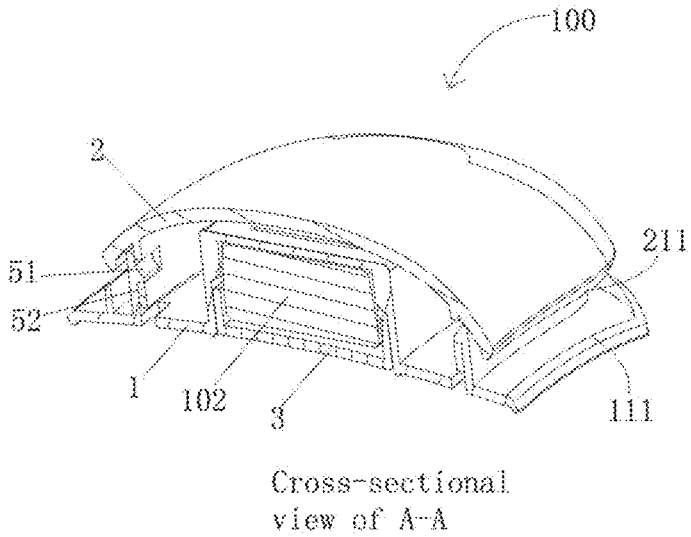
FIG. 10 is a cross-sectional view of A-A in FIG. 10.
Figure 11:
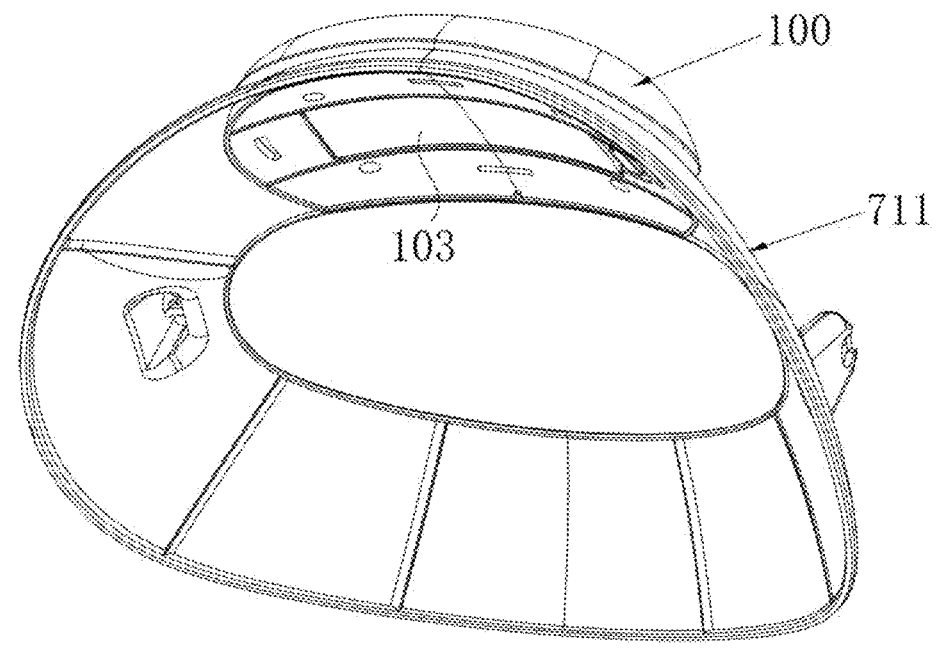
FIG. 11 is an assembling diagram of mounting a weight-balancing assembly on a back pillow assembly in the present disclosure.
Figure 12:
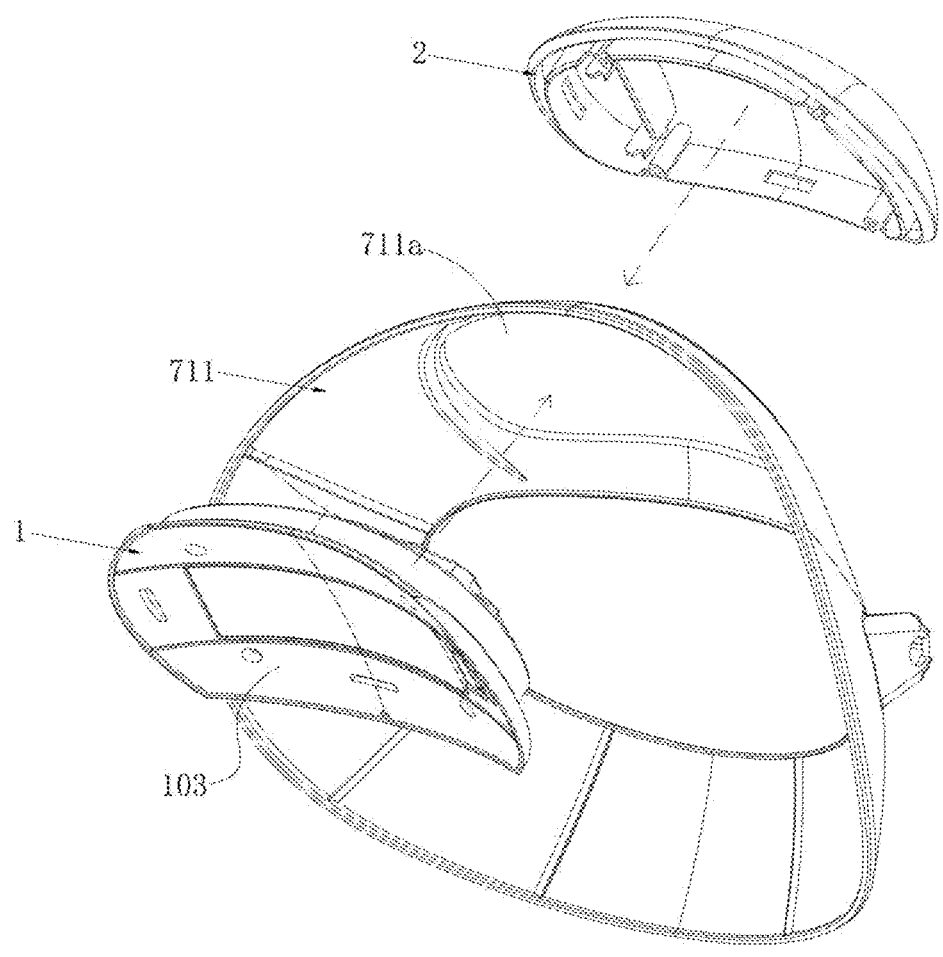
FIG. 12 is an exploded view of mounting a weight-balancing assembly on a back pillow assembly in the present disclosure.
Figure 13:
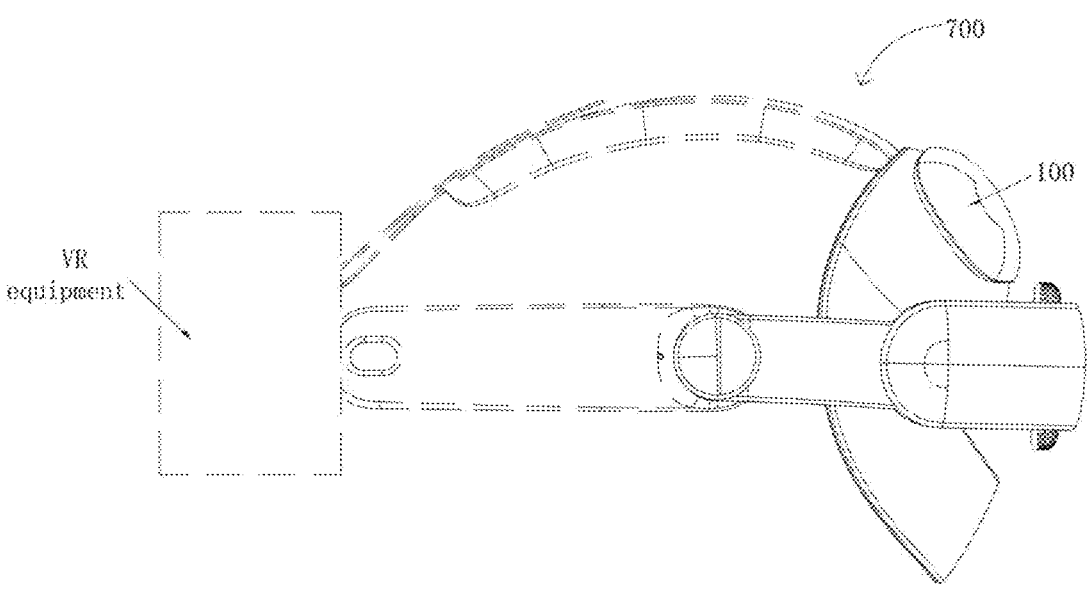
FIG. 13 is a reference diagram of an effect of combination between a VR head band with a weight-balancing assembly and VR equipment.

Specifically, to achieve flexible matching of the weight-balancing block 102, the weight-balancing compartment 101 is composed of a plurality of branch compartments 101a. The plurality of branch compartments 101a are distributed according to the radian of the fitting surface 103 of the weight-balancing box 10. If the fitting surface 103 is designed to be a concave surface, a surface formed by connecting the plurality of branch compartments 101 is also a concave surface. If the fitting surface 103 is designed to be a V-shaped angled surface, a surface formed by connecting the plurality of branch compartments 101 is also an angled surface. In an embodiment, the plurality of branch compartments 101 are arranged horizontally and vertically. FIG. 8 shows two branch compartments 101a which are arranged horizontally. To place the weight-balancing blocks 102, the branch compartment 101 on one side can be selected to accommodate the weight-balancing block s102, or different types of the weight-balancing blocks 102 can be selected for weight balancing as needed. This depends on a type and weight of VR equipment used at the front end Therefore, the user can select the weight-balancing blocks 102 for mounting according to an optimal weight combination prepared in advance for this product. In other optional embodiments, the plurality of branch compartments 101 are distributed in a circumference (not shown). In this embodiment, the weight-balancing compartment cover 33 is also circular or elliptical. The advantage of the circumference distribution of the branch compartments 101 is that the weight-balancing blocks 102 are dispersed into smaller units, which can be symmetrically placed and removed for weight increase and weight decrease. The weight-balancing blocks 102 are adjusted in this way has a less impact on the overall weight of the back pillow assembly 710 and the entire VR head band 700, thus achieving symmetrical fetching and placement.

Specifically, to facilitate the mounting of the weight-balancing compartment cover 33, a placement slot 132 is provided in one side of the compartment seat 13; and the hinge hole 131 is an open hinge hole 131 and is located on one side of the placement slot 132. During use, one side, provided with the pull clip 41, of the weight-balancing compartment cover can be plugged along the placement slot 132. When the pull clip 41 just reaches a position above the locking slot 42, the hinge shaft 31 just reaches the position of the hinge hole 131. In this way, the hinge shaft 31 is clamped into the hinge hole 131 to complete the mounting of the weight-balancing compartment cover 33. This mounting mode can greatly avoid the inconvenience caused to other components due to a large opening angle of the weight-balancing compartment cover 33 in the later stage. Therefore, this mounting mode is used to avoid the problem of considering an opening angle of the weight-balancing compartment cover 33, as the weight-balancing compartment cover 33 is plugged from the placement slot 132 in a side surface of the compartment seat 13.

The present disclosure further discloses a VR head band 700 with the weight-balancing assembly 100, including a back pillow assembly 710 and side straps 730. Side portions of the back pillow assembly 710 are connected with the side straps 730, and the foregoing weight-balancing assembly 100 is mounted on the back pillow assembly 710. According to the above, the weight-balancing assembly 100 and the back pillow assembly 710 are mounted in various mounting modes, such as using hook and loop fastener or clamping. Clamping is preferred here. Specifically, the back pillow assembly 710 includes a back pillow bracket 711 and back pillow cotton 712. An upper end of the back pillow bracket 711 is hollowed out to form a hollow groove 711a. During mounting, the bottom shell 1 is plugged upwards from a bottom of the hollow groove 711a, and the bottom enclosing ring 12 is threaded out of the hollow groove 711a. Since a size of the panel 11 is larger than that of the hollow groove 711a, the panel 11 is left at the bottom, that is, the bottom clamping portion 111 is left at the bottom. The cover shell 2 is plugged downwards from an upper end of the hollow groove 711a, and the diameter of the top enclosing ring 22 is less than that of the bottom enclosing ring 12. The top enclosing ring 22 is just plugged into the inner side of the bottom enclosing ring 12, and the second buckle 51 and the second buckle slot 52 are in clamping fit. Since a size of the surface cover 21 is greater than that of the hollow groove 711a, the top clamping portion 211 is left at a top of the hollow groove 711a. Thus, the top clamping portion 211 and the bottom clamping portion 111 clamp a groove wall of an edge of the hollow groove 711a in an up direction and a down direction respectively, so as to clamp the back pillow bracket 711. The bottom shell 1 and the cover shell 2 form the complete weight-balancing box 10, and the bottom of the weight-balancing box 10 has a fitting surface 103. The fitting surface 103 is located on an inner end surface of the back pillow bracket 711, namely, facing the back side of the head of a human body. However, to make a user feel more comfortable when wearing this product, the back pillow cotton 712 is arranged on the inner side of the back pillow bracket 711. The back pillow cotton 712 is preferably connected to the back pillow bracket 711 by using a hook and loop fastener. After the weight-balancing assembly 100 is mounted, the back pillow cotton 712 is fastened by using the hook and loop fastener. When a weight-balancing block 102 needs to be replaced, the back pillow cotton 712 is torn off; then the weight-balancing compartment cover 33 is opened to remove the original weight-balancing block 102 and replace a new weight-balancing block 102, or adjustment is performed by weight combination of the weight-balancing blocks 102. After the operation is completed, the weight-balancing compartment cover 33 is closed, and finally, the back pillow cotton 712 is fastened.

The above implementations are only preferred implementations of the present disclosure and cannot be used to limit the scope of protection of the present disclosure. Any non-substantive changes and replacements made by a person skilled in the art based on the present disclosure all fall within the scope of protection claimed by the present disclosure.

What is claimed is:

1. A virtual reality (VR) head band with a weight-balancing assembly, comprising a back pillow assembly and side straps, wherein the weight-balancing assembly is mounted on the back pillow assembly; and the weight-balancing assembly comprises:

a weight-balancing box;

a weight-balancing block; and a weight-balancing compartment cover, wherein one side of the weight-balancing box is sunken to form a weight-balancing compartment; the weight-balancing block is embedded in the weight-balancing compartment, to achieve weight balancing on a target device; the weight-balancing compartment cover is arranged on an outer side of the weight-balancing compartment and is opened and closed through a first locking member; the weight-balancing box has a fitting surface; and the fitting surface has a curved surface adapting to the back side of the head of a human body, and the weight-balancing compartment cover is located on the fitting surface with a bottom surface of the weight-balancing compartment cover being configured as part of the curved surface;

wherein the weight-balancing box comprises a bottom shell and a cover shell; a bottom side of the bottom shell is sunken to form the weight-balancing compartment; the bottom shell and the cover shell are detachably connected to each other through a second locking member; and after the bottom shell is connected to the cover shell, the target device with a hollow groove is clamped to achieve mounting and connection to the target device;

wherein the bottom shell comprises a panel, a bottom enclosing ring, and a compartment seat; the bottom enclosing ring is arranged at an upper end of the panel; the compartment seat is arranged on an inner side of the bottom enclosing ring; an inner side of the compartment seat is sunken to form the weight-balancing compartment; a bottom clamping portion is formed in a region, protruding out of the bottom enclosing ring, of the upper end of the panel; the cover shell comprises a surface cover and a top enclosing ring; the top enclosing ring is arranged on an inner side of the surface cover; and a top clamping portion is formed in a region of the surface cover protruding out of the top enclosing ring;

wherein the back pillow assembly comprises a back pillow bracket and back pillow cotton; an upper end of the back pillow bracket is hollowed out to form a hollow groove; the bottom enclosing ring of the bottom shell is threaded out of the hollow groove and is mounted and connected to the cover shell; the bottom clamping portion of the bottom shell and the top clamping portion of the cover shell clamp the back pillow bracket; and the back pillow cotton is arranged on an inner side of the back pillow bracket; and wherein the weight-balancing compartment has an opening, the fitting surface is on the bottom shell surrounding the opening, and the weight-balancing compartment cover is detachably inserted in the opening with the bottom surface of the weight-balancing compartment cover substantially smooth with the fitting surface.

\*  \*  \*  \*  \*